United States Patent [19]
Begley et al.

[11] Patent Number: 5,716,018
[45] Date of Patent: Feb. 10, 1998

[54] TAPE GUIDE FOR DIGITAL DATA TAPE MINI-CARTRIDGE

[75] Inventors: Paul V. Begley; Kevin L. Miller, both of Loveland; Kenneth G. Richardson, Fort Collins, all of Colo.

[73] Assignee: Hewlett-Packard Co., Palo Alto, Calif.

[21] Appl. No.: 768,262

[22] Filed: Dec. 17, 1996

Related U.S. Application Data

[63] Continuation of Ser. No. 651,404, May 22, 1996, Pat. No. 5,601,248.

[51] Int. Cl.[6] ................................................. G11B 23/087
[52] U.S. Cl. ........................................................... 242/346
[58] Field of Search ..................................... 242/341, 342, 242/346.2, 352.4; 226/196, 197; 360/130.21, 132

[56] References Cited

U.S. PATENT DOCUMENTS

| | | | |
|---|---|---|---|
| 3,692,255 | 9/1972 | Voh Behren | 242/342 |
| 3,861,619 | 1/1975 | Wolff | 242/341 |
| 3,991,956 | 11/1976 | Machida | 242/342 |
| 4,324,372 | 4/1982 | Majicek et al. | 242/342 |
| 4,333,618 | 6/1982 | Seaman | 242/352.4 |
| 4,502,648 | 3/1985 | Newell | 242/343.2 |
| 4,534,523 | 8/1985 | Zarr | 242/342 |
| 4,642,721 | 2/1987 | Georgens et al. | 242/352.4 |
| 4,920,439 | 4/1990 | Bordignon | 242/346 |
| 5,104,058 | 4/1992 | Eggebeen | 242/342 |
| 5,188,310 | 2/1993 | Rotter | 242/342 |
| 5,203,519 | 4/1993 | Rotter | 242/342 |
| 5,289,988 | 3/1994 | Madsen | 242/342 |
| 5,299,756 | 4/1994 | Hu et al. | 226/196 |
| 5,333,806 | 8/1994 | Stanley et al. | 242/342 |
| 5,358,193 | 10/1994 | Madsen et al. | 242/342 |

*Primary Examiner*—John P. Darling
*Attorney, Agent, or Firm*—Augustus W. Winfield; Patrick J. Murphy

[57] ABSTRACT

A tape guide for a digital tape mini-cartridge providing decreased tape wander in a direction transverse to the intended path. The guide provides an increased area of tape having increased transverse stiffness without interfering with an adjacent drive wheel. In one embodiment, the guide is cylindrical and has a cylindrical cut-out to provide clearance for an adjacent cylindrical drive wheel. Preferably, the guide has top and bottom flanges. If a top flange of the guide is present, the cut-out continues through the top flange of the guide. The top flange of the guide may be relatively thin to fit below a top flange of the adjacent drive wheel. Alternatively, the top flange of the guide may have a larger cut-out to avoid interference with the top flange.

1 Claim, 8 Drawing Sheets

TAPE GUIDE FOR DIGITAL DATA TAPE MINI-CARTRIDGE

This is a continuation of application Ser. No. 08/651,404 filed on May 22, 1996, now U.S. Pat. No. 5,601,248.

FIELD OF INVENTION

This invention relates generally to digital data tape cartridges and more specifically to tape guidance.

BACKGROUND OF THE INVENTION

In 1972, a belt driven tape cartridge design (U.S. Pat. No. 3,692,255, issued to Robert A. Von Behren) was introduced for use in the computer industry for digital tape recording. Cartridges commonly in use in 1972 were approximately 100 mm by 150 mm and the magnetic tape was 6.35 mm (0.250 inches) wide. Cartridges of that size are commonly called DC-6000 cartridges. DC-6000 cartridges and corresponding drive mechanisms are still commercially available. In 1976, smaller data cartridges were developed, as described by Alan J. Richards, *Mini Data Cartridge: A Convincing Alternative for Low-Cost, Removeable Storage*, Hewlett-Packard Journal, May, 1976. The minicartridge size is 63.5 mm by 82.5 min. Mini-cartridges are commonly called DC-2000 cartridges. DC-2000 cartridges and corresponding drive mechanisms are still commercially available. Since both sizes of cartridges were first introduced, data densities, track densities, and tape speeds have all increased substantially. Further increases in track density are limited by the degree to which the tape can be prevented from wandering transversely within its intended path.

Both sizes of cartridges described above have two openings in one edgewall. One opening provides access to the tape by a magnetic head. The second opening provides access to an internal drive roller. The larger cartridges described above typically have three non-rotating tape guides along the edgewall containing the openings, so that there is a guide on each side of each opening with one guide in common. Therefore, when a magnetic head penetrates into the tape cartridge, the span of tape across the head is supported by two guides. Likewise, the span of tape across the drive roller is supported by two guides. In the larger size cartridges, each guide typically has a flange or shoulder on each end to provide a precise guidance path for the tape.

The three guides described above have been extensively analyzed for their effect on tape wear and guidance. For example, as disclosed in the Richards article, the surface finish of the guides is critical. If the guides are too rough, rapid tape wear results. If the guides are too smooth, the tape tends to adhere to the guides resulting in a high drive force and high-frequency tape speed variations. In addition, the three guides described above are the subject of several patents in which tape guidance is improved, primarily as a result of refinements to the guide flanges. U.S. Pat. No. 4,534,523 issued to Myron Zarr on Aug. 13, 1985 discloses guides where the flanges are arranged so that alternate guides provide a centering force against opposite edges of the tape. U.S. Pat. No. 5,104,058 issued to James A. Eggebeen on Apr. 14, 1992 discloses guides in which one guide has a wide clearance and the guides are arranged so that as the tape contacts a flange of the wider guide, the tape edges are forced against alternate flanges on the other two guides. Each of the patents just described addresses the effects of guide flanges on the edges of the tape but not the effects of the main guide surfaces in contact with the back surface of the tape or the effects of the length of the tape edge in contact with a flange.

In the larger size cartridges, the three guides typically all have the same diameter. Mini-cartridges may or may not have a central guide. Due to mechanical design constraints, in those mini-cartridges that have a central guide, the central guide is typically a small flangeless pin much smaller in diameter than the two outer guides. A larger diameter central guide would interfere with the internal drive roller. For example, U.S. Pat. No. 4,324,372 issued to Stepan Majicek and Harry R. Robinson on Apr. 13, 1982 discloses a mini-cartridge with three guides. In Majicek, two relatively large outer guides are provided with conically shaped flanges to help center the tape with reduced edge damage but the central guide is a simple relatively small diameter flangeless pin. The Zarr patent described above discloses a relatively small diameter central guide having one shoulder. U.S. Pat. No. 5,289,988 issued to David D. Madsen on Mar. 1, 1994 discloses a mini-cartridge having additional guides near the tape reels. The central guide in Madsen is a relatively small diameter flangeless pin. There is a need for further improvement in tape guidance in mini-cartridges.

SUMMARY OF THE INVENTION

In the invention, a larger central guide is used. Wrapping the tape around a larger guide, with a larger surface contact between the guide and the back of the tape, increases the area of the tape having a transverse stiffness, reducing the amount of transverse movement. If flanges are provided, the larger guide increases the length of tape edge, in the area with increased transverse stiffness, in contact with a flange. In an example embodiment, the guide provides a cylindrical wrap area but a cross section of the guide has a cut-out portion to avoid interference with the drive roller. The guide may optionally be provided with a flange providing edge guidance at the wrap area but clearance for the drive roller outside the wrap area.

DETAILED DESCRIPTION OF THE PREFERRED EMBODIMENT OF THE INVENTION

Figure 1A:
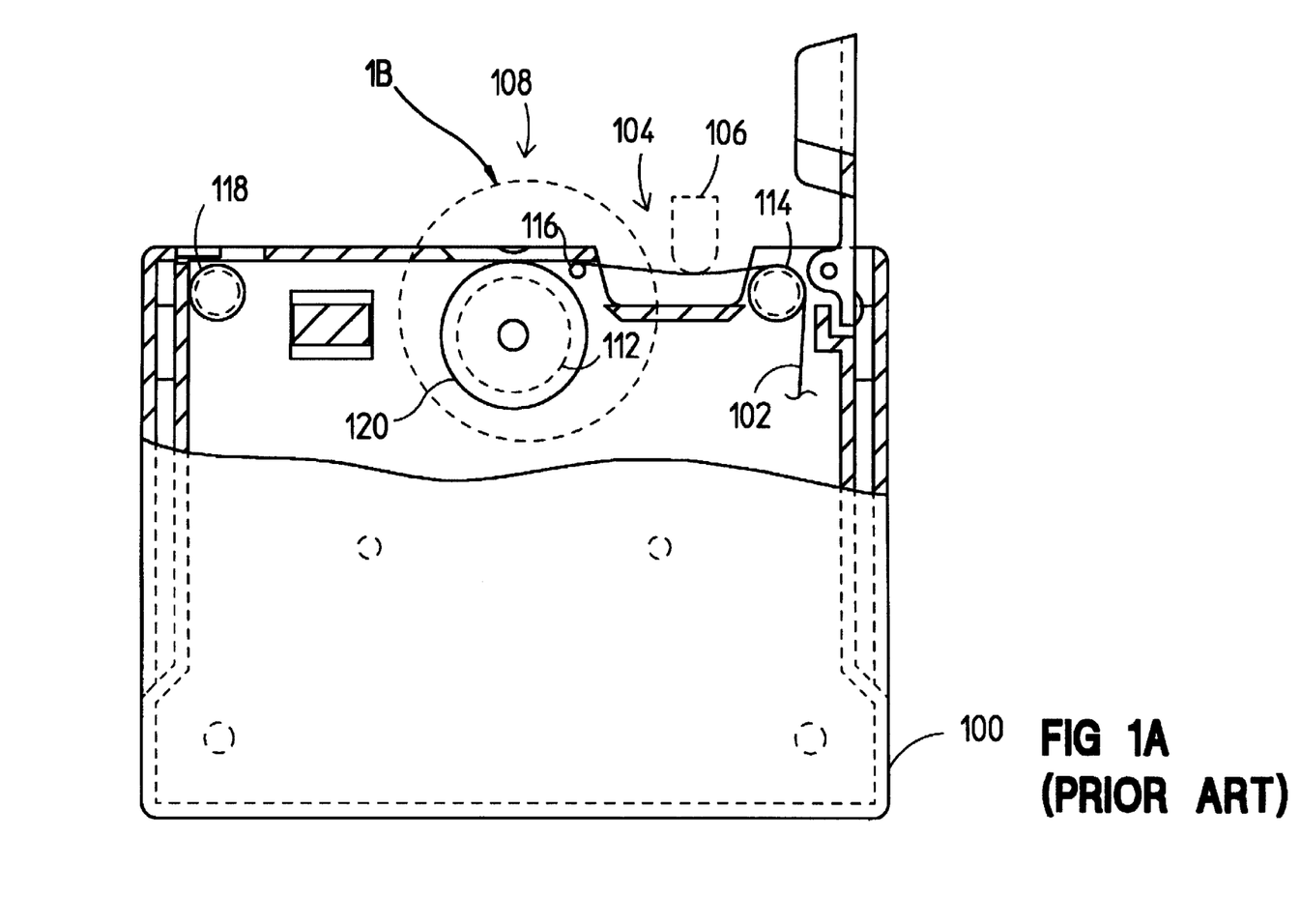
FIG. 1A (prior art) is a partially cut-away top view of a mini-cartridge illustrating tape guides in relation to other cartridge parts.

In FIG. 1A, a prior an mini-cartridge 100 has a magnetic data tape 102. A first opening 104 provides access for a magnetic head 106. A second opening 108 provides access for an external capstan (not illustrated). The external capstan engages an internal drive wheel 112 that drives an internal drive belt (not illustrated). The external capstan engages a flange 120 on the top of the internal drive wheel 112 so that the tape 102 passes between the external capstan and the internal drive wheel 112 without touching either the external capstan or the internal drive wheel 112. Two non-rotating cylindrical guides 114 and 118 position the tape 102 transverse to the direction of movement past the head 106. A smaller diameter guide pin 116 in conjunction with guides 114 and 118 defines the tape path around the head 106 and guides the tape path between the drive wheel 112 and the external capstan.

Figure 1B:
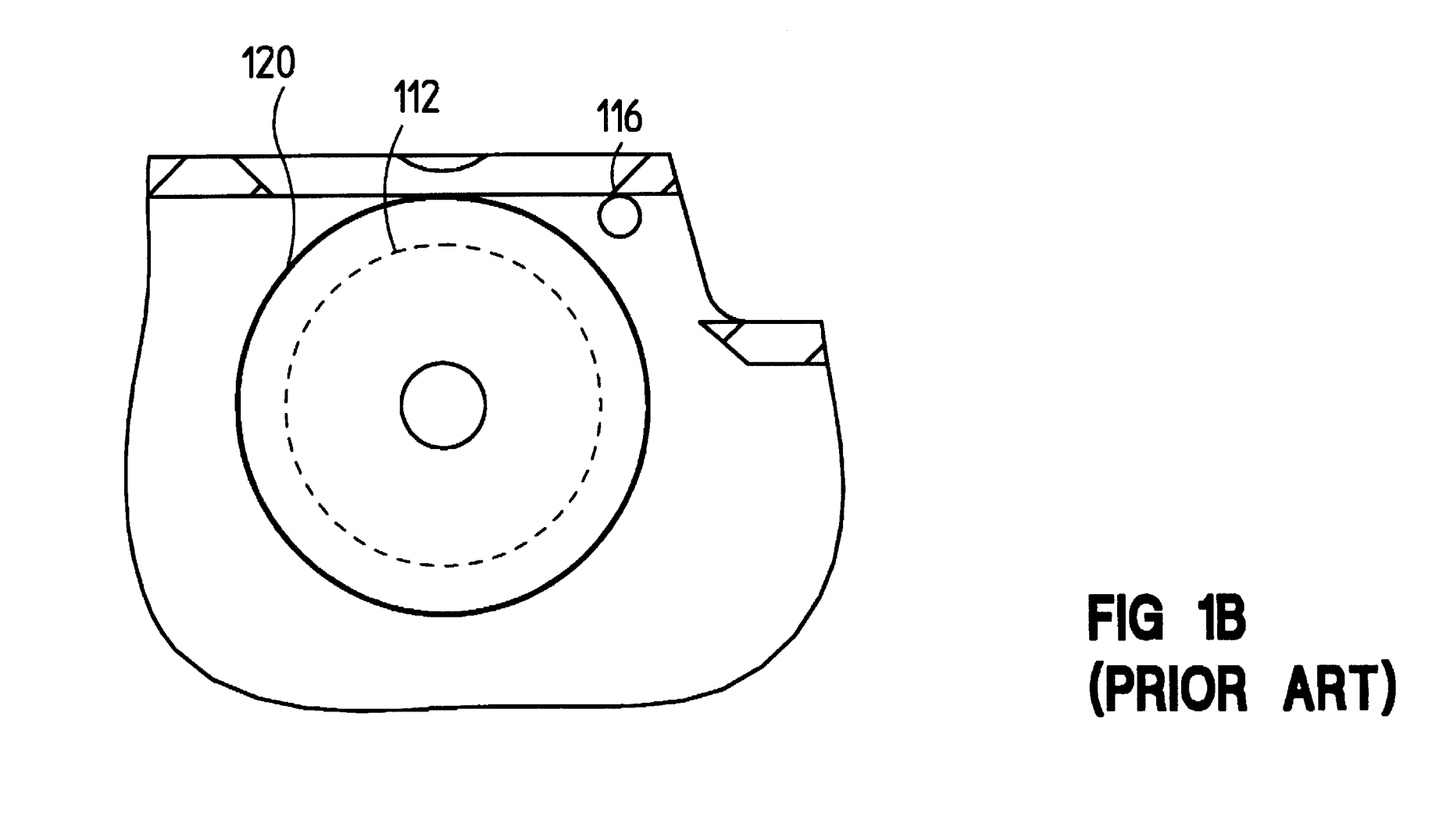
FIG. 1B (prior art) is an expanded view of part of the mini-cartridge of FIG. 1A illustrating an internal guide wheel and small guide pin.
Figure 1C:
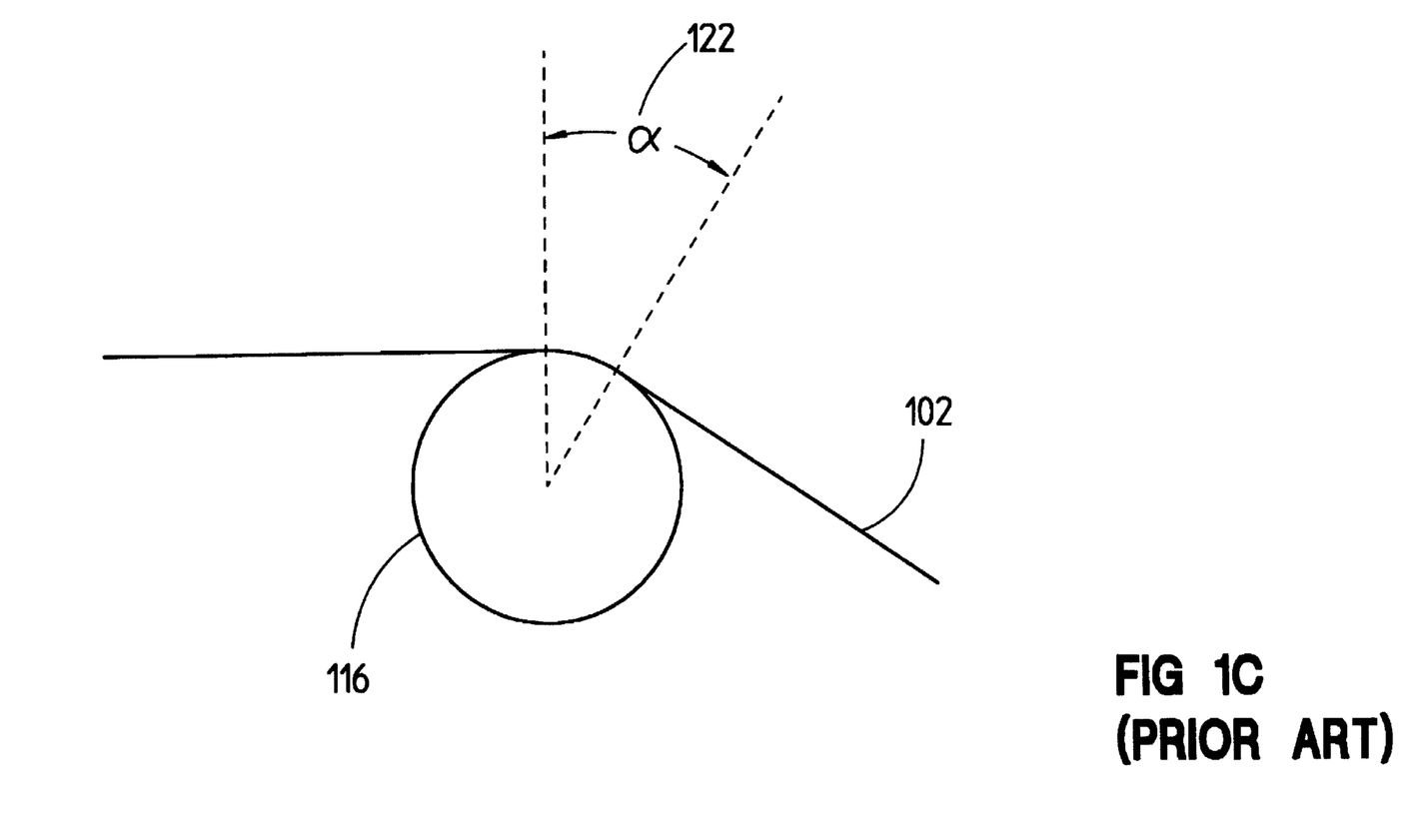
FIG. 1C (prior art) is an expanded view of part of the mini-cartridge of FIG. 1A illustrating just the small guide pin with the magnetic tape wrapped around the pin.

FIG. 1B is a cut-away expanded view illustrating the guide pin 116 in relation to the drive wheel 112. FIG. 1C is a further expanded view of the guide pin 116 and the tape 102. The diameter of prior-art guide pin 116 is typically about 1.59 mm (0.0625 in.). When the magnetic head (FIG. 1A, 106) is fully inserted, the wrap angle α (FIG. 1C, 122) for the magnetic tape 102 around the guide pin 116 is about 7°. For guide pin 116, the maximum length of tape along one edge in contact with a flange (if any) is the wrap angle in Radians multiplied by the radius and the resulting maximum length is 0.0970 mm (0.00382 in). The area of tape supported by the guide is the edge length of wrap multiplied by the width of the tape (6.35 mm, 0.25 in.) and the resulting area is 0.616 mm² (0.00096 in²).

Figure 2A:
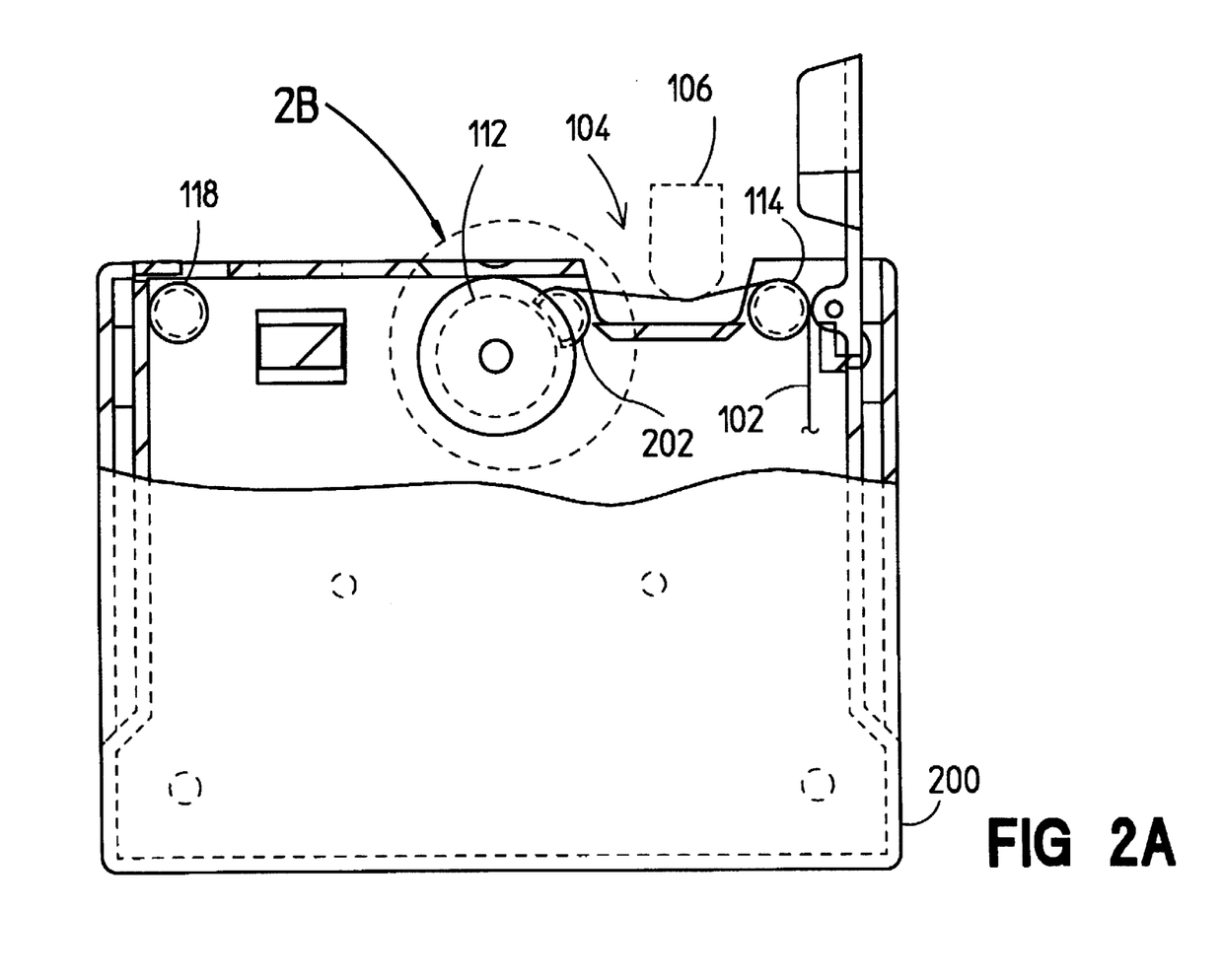
FIG. 2A is a partially cut-away top view of a mini-cartridge in accordance with an example embodiment of the invention.
Figure 2B:
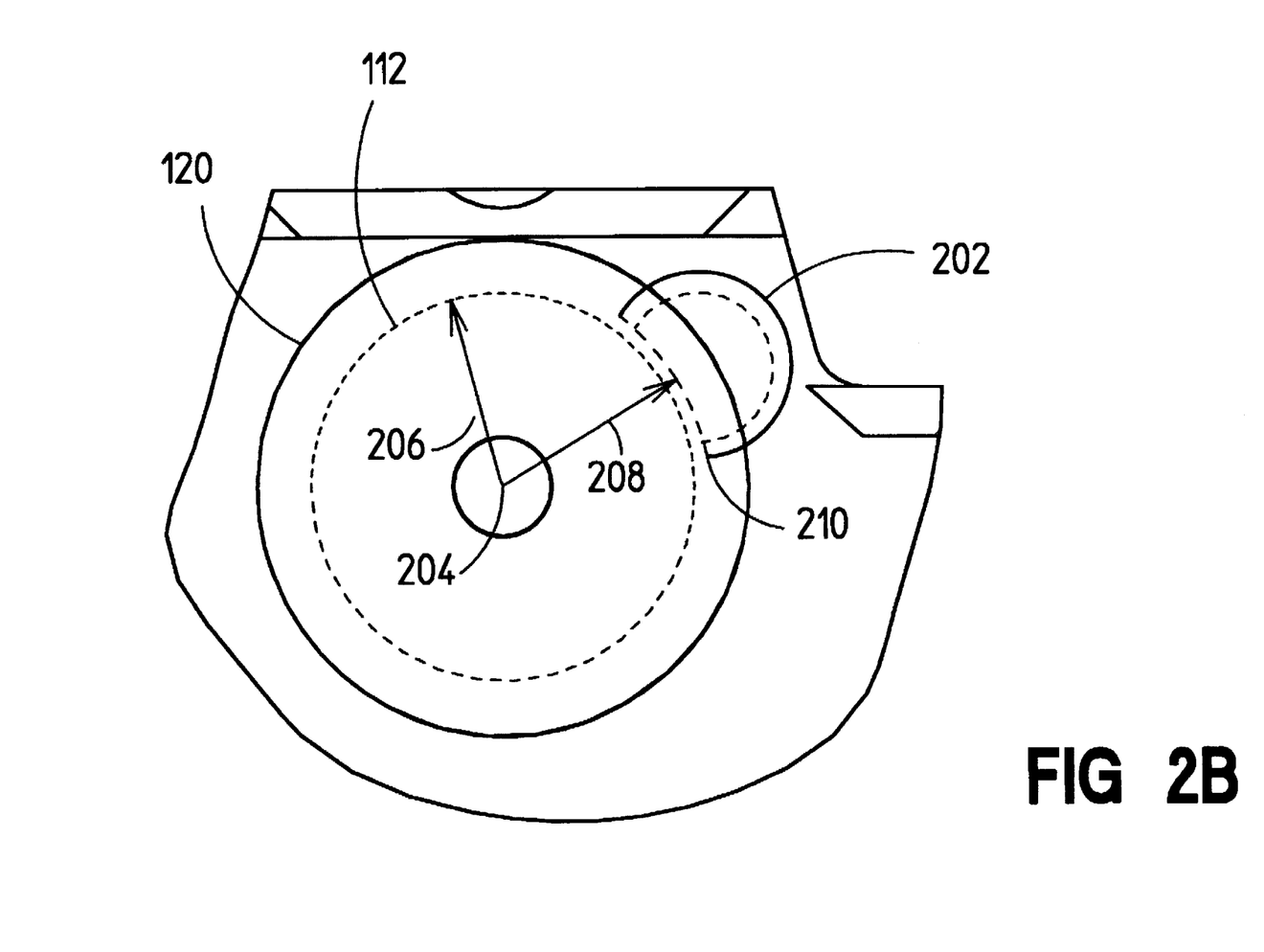
FIG. 2B is an expanded view of the mini-cartridge of FIG. 2A illustrating an internal guide wheel and a large guide.

FIG. 2A is a top view of a mini-cartridge 200 containing one specific embodiment of a larger guide 202 in accordance with the invention. In the example embodiment, guide 202 in FIG. 2A is cylindrical and has a diameter of 4.76 mm (0.188 in.) (the same as guides 114 and 118) and preferably has a flange on top and bottom. FIG. 2B is a expanded view of the guide pin 202 in relation to the drive wheel 112. The drive wheel 112 has a center point 204 and a radius 206. The guide pin 202 has a cut-out area 210 defined by an are that has a center point 204 and a radius 208. The radius 208 is greater than the radius 206 so that the cut-out 210 prevents the guide 202 from interfering with the drive wheel 112. Note in the embodiment illustrated in FIG. 2A that the flange 120 on top of the drive wheel 112 is above the guide 202 (see FIG. 3B). However, if it is desirable to make the guide 202 taller, the cut-out radius 208 must be made longer than the radius of the drive wheel flange 120.

The wrap angle of the magnetic tape 102 around guide 202 is about 7° just as for the guide 116 illustrated in FIG. 1C. Increasing the radius of the guide 202 relative to the guide 116 increases the area of the tape wrapped in contact with the guide, thereby increasing the area of tape having a transverse stiffness and increasing the length of tape edge, in the area of increased transverse stiffness, in contact with a guide flange. As a result, the tape 102 wrapped around the guide 202 has a greater transverse stiffness relative to the tape 102 wrapped around the smaller pin 116 in FIG. 1A. Test data on transverse movement of one tape edge using cartridges having 1.59 mm guide pins as in guide pin 116 in FIG. 1A indicates significant variation from cartridge to cartridge. Typical transverse movement of one edge is on the order of 9.6 μm (380 μ-in.) and some cartridges exhibit movements of as much as 19 μm (750 μ-in.) at 76.2 cm/sec (30 in/sec). Cartridges with 4.76 mm guides and flanges as in guide 202 in FIG. 2A reduce worst case track deviation by at least 50% relative to 1.59 mm guides without flanges, exhibiting worst case transverse movements on the order of 4.8 μm (190 μ-in.).

Note in FIGS. 2A and 2B that a guide 202 that is slightly larger than a prior art 1.59 mm pin (FIG. 1A, 116) can be provided without requiring a cut-out in the guide. Alternatively, the center point of guide 202 can be moved slightly to permit a larger guide but without a cut-out and without interference with the drive wheel 112. Note that the surface of the guide contacting the tape must be aligned with corresponding surfaces on guides 114 and 118. The above test measurements were made with a center guide identical to guides 114 and 118 but with a slightly shifted center point to avoid interference with the drive wheel 112. The specific embodiment illustrated in FIG. 2A merely illustrates that if a cylindrical guide interferes with the drive wheel 112, a cut-out can be made to eliminate the interference. For convenience in fabrication, the guide 202 illustrated in FIG. 2B may be made as a modification of guides 114 and 118. That is, the diameter of guide 202 may be the same as guides 114 and 118 and guide 202 may have a flange on the top and bottom. Note that guides 114 and 118 have top and bottom flanges that are typically 6.00 mm (0.236 in.) in diameter. The guide 202 illustrated in FIG. 2B is cylindrical with a cylindrical cut-out 210 and has a thin flange on top to fit underneath the drive wheel flange 120 (see FIG. 3B). While cylindrical shapes are relatively easy to fabricate by machining, it is not necessary for the guide 202 to have a cylindrical surface. Any number of curved surfaces such as elliptical, parabolic or other smooth curved shapes may be suitable. Likewise, it is not necessary for the cut-out 210 to have a cylindrical surface. It is only necessary for cut-out 210 to provide clearance for the internal guide wheel 112. The primary requirements are (1) some wrap to provide an area with transverse stiffness, (2) an increased area of transverse stiffness relative to a small diameter pin, (3) no interference with the internal drive wheel and (4) adequate support to withstand the various tape forces on the surface and on the flanges (if any). Desirable additional attributes are flanges at the top and bottom to provide an increased length of edge guidance, within the wrap area, relative to a small diameter pin.

Figure 3A:
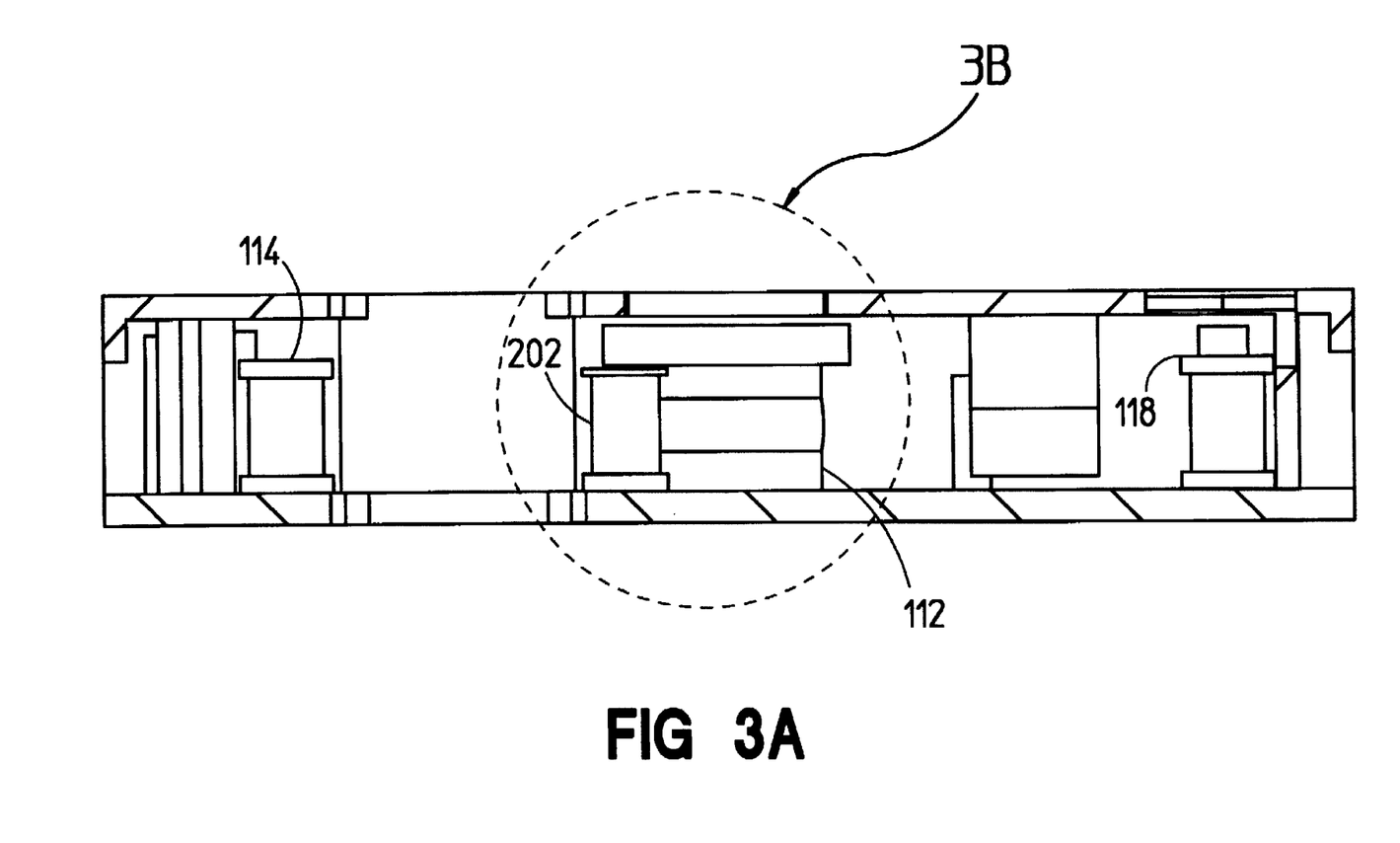
FIG. 3A is a cut-away front view of the mini-cartridge of FIG. 2A.
Figure 3B:
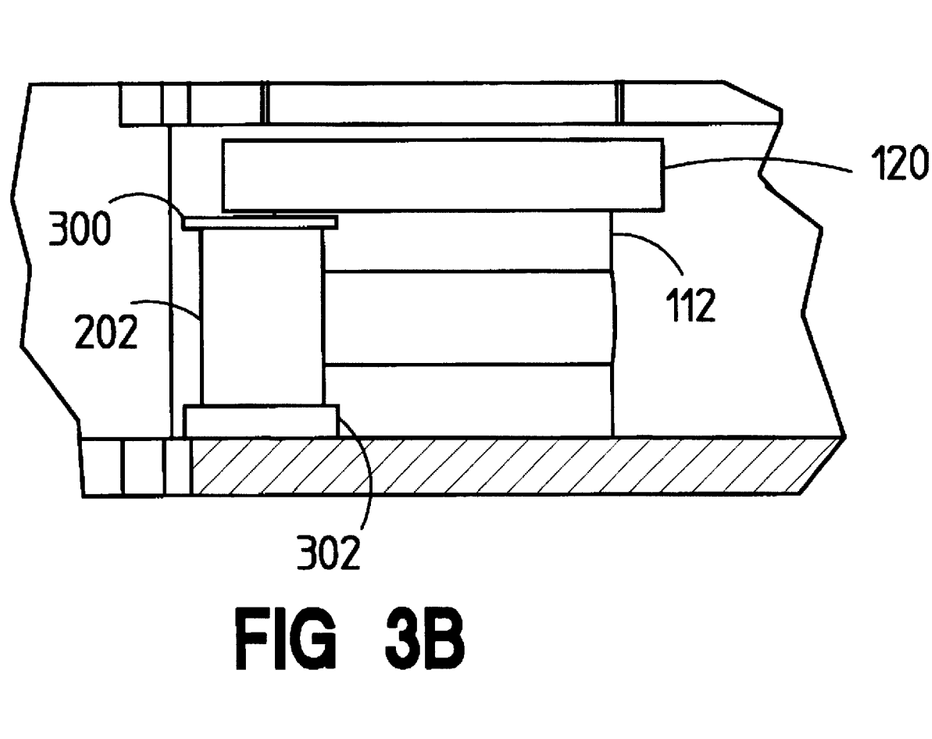
FIG. 3B is an expanded view of part of the mini-cartridge of FIG. 3A.

The internal drive wheel 112 is depicted in FIGS. 2B and 3B and other figures as having a smooth circular top flange 120. In present mini-cartridge designs, the top flange 120 is driven by a smooth external capstan. However, the top flange 120 may also be a toothed gear driven by an external gear. This would not impact the basic requirements for the guide 202 as described above as long as the guide 202 does not interfere with the gear. Therefore, the term "guide wheel" should be interpreted as including a guide gear for purposes of the invention.

FIG. 3A is a cut-away front view of the cartridge embodiment of FIG. 2A. FIG. 3B is an expanded view illustrating just the guide 202 and drive wheel 112. Note that the drive wheel 112 has a top flange (or gear) 120. Note that a thin flange 300 on guide 202 can fit beneath the drive wheel flange (or gear) 120. Note also, however, that the flange 300 can be made taller by providing a cut-out area sufficient to provide clearance for the drive wheel top flange (or gear) 120. Note also that in the specific embodiment, the guide 202 has a second flange 302 on the bottom.

Figure 4:
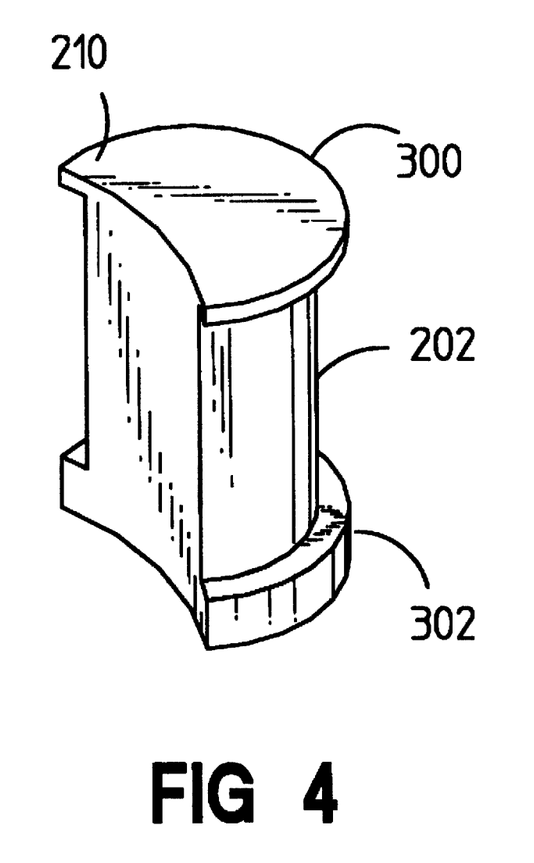
FIG. 4 is a perspective view of a large guide in accordance with an example embodiment of the invention.

FIG. 4 is a perspective view of guide 202. Note that as depicted in FIG. 4, guide 202 can be fabricated by modifying a guide as used for guide 114 or 118 in FIG. 1A. In the specific embodiment illustrated, the top flange 300 is made thinner to clear the top flange (or gear) 120 of the drive wheel and a cylindrical cut-out 210 in one side provides clearance for the belt surface of the drive wheel.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A guide pin for a tape in a digital tape mini-cartridge, the tape having a back surface; the digital tape mini-cartridge having a drive wheel adjacent to the guide pin, the guide pin comprising:

a curved surface providing an area in contact with the back surface of the tape that is substantially greater than 0.616 mm$^2$; and the curved surface extending beyond the area in contact with the back surface of the tape but not interfering with the drive wheel.

wherein the tapes resides within the digital tape mini-cartridge, the digital tape mini-cartridge having a width equal to less than 100 min.

the tape having a top edge;

the guide pin having a guide top;

a top flange on the guide top;

wherein if the top edge of the tape is in contact with the top flange; the top flange provides contact with substantially greater than 0.097 mm of the top edge the top flange does not interfere with the drive wheel.

* * * * *